US008443009B2

(12) United States Patent
Heller et al.

(10) Patent No.: US 8,443,009 B2
(45) Date of Patent: May 14, 2013

(54) DATA PROCESSING SYSTEM HAVING SERVICES FOR PROVIDING FUNCTIONALITIES

(75) Inventors: Rainer Heller, Eckental (DE); Thomas Jachmann, Nürnberg (DE)

(73) Assignee: Siemens Aktiengesellschaft, München (DE)

( * ) Notice: Subject to any disclaimer, the term of this patent is extended or adjusted under 35 U.S.C. 154(b) by 1872 days.

(21) Appl. No.: 10/513,056

(22) PCT Filed: Apr. 16, 2003

(86) PCT No.: PCT/DE03/01289
§ 371 (c)(1),
(2), (4) Date: Oct. 28, 2004

(87) PCT Pub. No.: WO03/094045
PCT Pub. Date: Nov. 13, 2003

(65) Prior Publication Data
US 2005/0131954 A1    Jun. 16, 2005

(30) Foreign Application Priority Data

Apr. 29, 2002  (DE) ................................. 102 19 094
Jul. 3, 2002    (DE) ................................. 102 29 879

(51) Int. Cl.
*G06F 17/30*       (2006.01)
(52) U.S. Cl.
USPC ........................................................ 707/805

(58) Field of Classification Search .................... 707/10, 707/202, 203, 204
See application file for complete search history.

(56) References Cited

U.S. PATENT DOCUMENTS

| 6,173,407 | B1 * | 1/2001 | Yoon et al. .................. 726/9 |
| 6,480,890 | B1 * | 11/2002 | Lee et al. ..................... 709/223 |
| 6,486,892 | B1 * | 11/2002 | Stern ............................ 715/760 |
| 6,560,618 | B1 * | 5/2003 | Ims ............................... 707/204 |
| 6,574,617 | B1 * | 6/2003 | Immerman et al. ............. 707/1 |
| 6,704,401 | B2 * | 3/2004 | Piepho et al. ........... 379/102.03 |
| 6,915,482 | B2 * | 7/2005 | Jellum et al. ................. 715/234 |
| 6,961,567 | B1 * | 11/2005 | Kuhn ......................... 455/435.1 |
| 6,993,502 | B1 * | 1/2006 | Gryglewicz et al. ........... 705/31 |
| 7,035,943 | B2 * | 4/2006 | Yamane et al. ............... 709/248 |
| 7,143,193 | B1 * | 11/2006 | Abbott et al. ................. 709/248 |
| 7,227,656 | B1 * | 6/2007 | Kato ........................... 358/1.15 |

FOREIGN PATENT DOCUMENTS

| WO | WO 01/76187 A1 | 10/2001 |
| WO | WO 02/21338 A2 | 3/2002 |

OTHER PUBLICATIONS

Heather Kreger, "Web Services Conceptual Architecture (WSCA 1.0)", IBM Software Group, May 2001, pp. 1-41, XP-002203346.
Sankar Virdhagriswaran, Dr. Gordon Dakin and Dan Leliberte, "Two Level Architecture for Web Service Interactions Position Paper to Workshop on Web Services", The World Wide Web Consortium (W3C), Mar. 2001 Proceedings, pp. 1-3.

(Continued)

*Primary Examiner* — Baoquoc N To

(57) ABSTRACT

The invention relates to a data processing system with an improved provision of services for providing functionalities. The data processing system comprises at least one first service for activating at least one second service, whereby the services are configured as Web services.

20 Claims, 2 Drawing Sheets

OTHER PUBLICATIONS

Mark Nottingham, "Web Service Scalability and Performance with Optimising Intermediaries", The World Wide Web Consortium (W3C). W3C Workshop on Web Services, Version: 1.01, Mar. 12, 2001, pp. 1-24.

Christoph Gönnheimer, Robert Landwehr and Torsten Volkmann, SOAP in der Automatisierungstechnik: "Industrial Ethernet and XML zur Vernetzung von Steuerungen", Web Services Conference & Exhibition, Oct. 29-31, 2001, Stuttgart, Germany, pp. 1-20.

* cited by examiner

DATA PROCESSING SYSTEM HAVING SERVICES FOR PROVIDING FUNCTIONALITIES

CROSS REFERENCE TO RELATED APPLICATIONS

This application is the US National Stage of International Application No. PCT/DE03/01289, filed Apr. 16, 2003 and claims the benefit thereof. The International Application claims the benefits of German application No. 10219094.1 filed Apr. 29, 2002, and of German application No. 10229879.3 filed Jul. 3, 2002, all three of the applications are incorporated by reference herein in their entirety.

FIELD OF INVENTION

The invention relates to a data processing system with services for providing functionalities.

BACKGROUND OF INVENTION

In such a data processing system services for providing functionalities can be realized as so-called Web services. Web service technology is found increasingly on the Internet and is contributing to converting it from a user-centered information medium into an information and Web service landscape that can be used directly by applications. This usually involves the use of standard Internet technologies (HTTP, SOAP, WSDL, UDDI) to enable Web services to be used directly in an application. The Web services of the currently-defined Web service technology are arranged statically.

SUMMARY OF INVENTION

The object of the invention is to improve the provision of services in a data processing system.

This object is achieved by a data processing system with services for providing functionalities, in which at least one first service is provided for activating at least one second service, with the services being embodied as Web services.

The invention is based on the knowledge that today's static arrangement for providing services on data processing systems brings with it serious disadvantages. Previously there have not been any dynamic services which can be explicitly started or stopped, in order for example for them to be provided depending on a current system status or to suppress their service. Directory services covering existing services in the data processing system are currently typically set up centrally and statically. Information about services which are offered on a specific computer is currently also only available as static, rudimentary and local information. Through the inventive use of a first service to activate at least one second service dynamic services will be implemented. Thus generic applications can be created which use the services of the data processing system. These applications can configure themselves dynamically from available services. The services provided can vary at run time of the data processing system. They can be activated dynamically depending on their environment. The data processing system in accordance with the invention is accessible without additional infrastructure with standardized Internet mechanisms since the services are embodied as Web services. Web services use standard Internet protocols and mechanisms, for example HTTP (HyperText Transfer Protocol), SOAP (Simple Object Access Protocol), WSDL (Web Service Description Language).

In accordance with advantageous embodiments of the invention the first service is also provided for loading, deactivating and/or updating at least one second service. The activation and deactivation of the at least one second service is advantageously undertaken depending on a current status of the data processing system. Status of the data processing system here is also taken to mean information present within the data processing system. Thus for example alarm services can only be activated depending on specific criteria, run-time dependent services can only be activated outside busy times. Expanded diagnostic services can be enabled once the service has been paid for (e.g. via micropayment).

In accordance with a further advantageous embodiment of the invention, means are provided to provide status information for the services. Previously-known directory services (e.g. UDDI) provide a central static solution for discovery of services, e.g. Web services and their functionalities. The means proposed here for providing status information on the services can be embodied as a decentralized directory service for functions/services. The relevant data processing system can thus give information about its services and their functionalities. The information can be requested at different levels of granularity. Possible status information for the services contains the following information for example:

Services available on the data processing system
Current availability of a service
Necessary conditions for a service to be able to be activated
Information about whether a service is loaded into the system temporarily or permanently
Further descriptions of a service, such as interface description, issue, documentation.

The proposed means for providing status information for the services delivers a defined unique error message when a service is (temporarily) not present or is stopped.

Services can be dynamically started or stopped not just internally (in the data processing system), but also explicitly from outside if, in accordance with a further embodiment of the invention, at least one application interface for the data transfer between the data processing system and external communication partners is provided. This application interface can be executed as a Web service (e.g. as a so-called administration Web service).

As stated above, today's known services are arranged statically (i.e. they run continuously in a data processing system and cannot be provided dynamically or removed again and from a (closed) system. To avoid this disadvantage it is proposed that the application interface is provided for loading of services. This makes possible a dynamic reloading of services at run time and the simple incorporation of new services into the data processing system. This is implemented for example via a standardized Web service which performs this task. This makes it possible to load at a service dynamically into a data processing system at run time, to start it there and if necessary also to remove it again. In particular this allows the reloading of newer versions of service (update/upgrade), e.g. to rectify errors or to expand the functionality of a service. This type of update is possible without disruption—even during operation, provided the service itself does not maintain any state and only uses the state of the data processing system. In addition this mechanism makes it possible to replicate services on a plurality of data processing systems. It thus permits system updates to be handled automatically using a program, compared to today's usual manually-initiated download of updates.

The data processing system in accordance with the invention and its embodiments described above are advantageously used as part of an automation system, where the services are provided to provide automation functionality. In the automation world too services which have previously been rendered by an automation device cannot adapt dynamically to changed circumstances. This would for example be necessary to distinguish between commissioning mode and productive mode. In productive mode a part of the device functionality may not be called directly. Thus these functions should also only be available in a commissioning phase. With dynamic services in accordance with the invention the services offered during commissioning can be other than those used in normal operation. A further advantage is produced by the fact that information can be obtained on all devices via the same application interface about the device and the services that it provides. An automation device describes itself with "identical" means. In the world of automation technology in particular this similar, uniform access to the automation device and its similar access scheme are extremely advantageous.

The invention is described and explained in more detail below on the basis of the exemplary embodiment shown in the Figures.

The diagrams show:

DETAILED DESCRIPTION OF INVENTION

Figure 1:
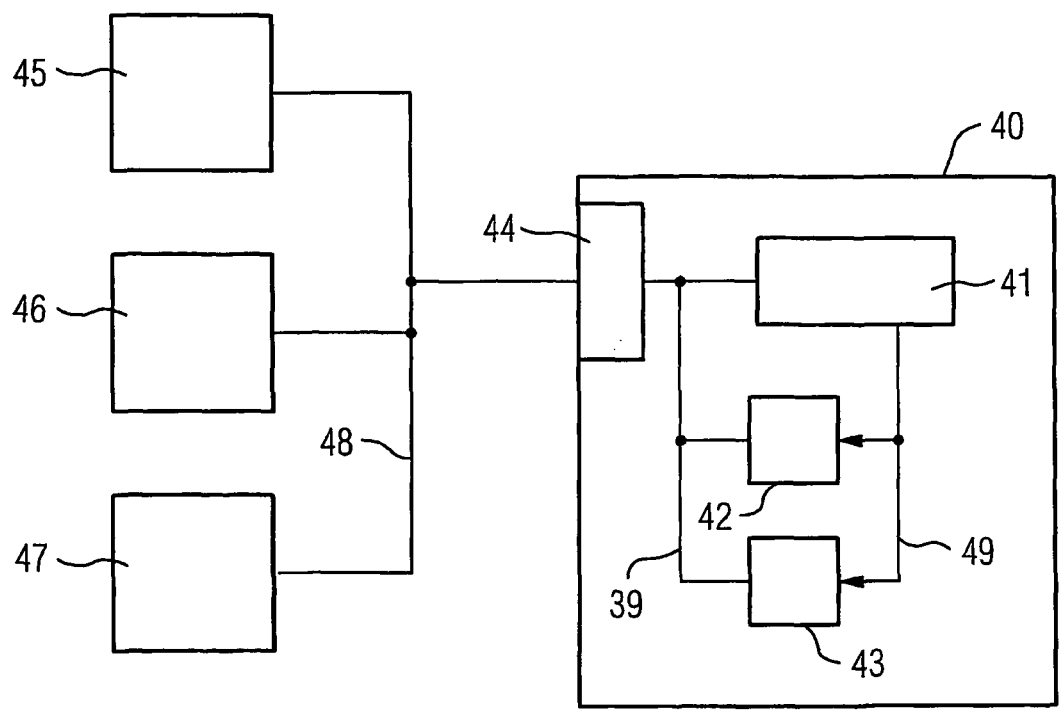
FIG. 1 a schematic diagram of a data processing system with services to provide functionalities and FIG. 2 the use of Web services in a distributed automation system

FIG. 1 shows a schematic diagram of a data processing system 40 with services 41 to 43 for provision of functionalities. A first service 41 can activate and deactivate a second and/or a third service 42 or 43 via an effective connection 49. The data-processing system 40 of the exemplary embodiment in FIG. 1 also features an application interface 44 for transferring data between the data processing system 40 and external communication partners 45 to 47. The application interface is for example provided for loading the services 42, 43. The services 41 to 43 are accessible from outside via the connections 48, 39.

Figure 2:
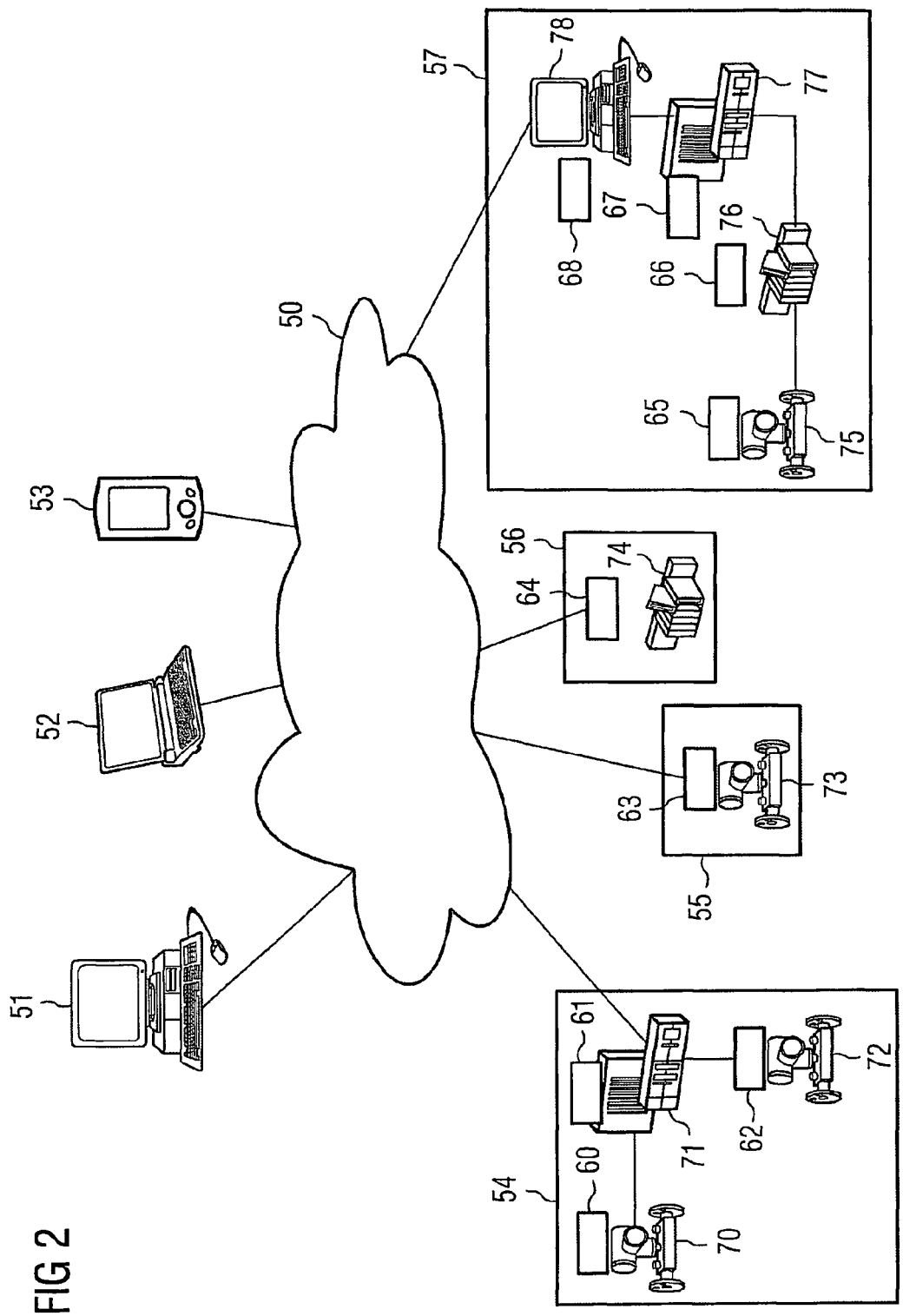

The use of Web services in a distributed automation system is shown in FIG. 2. The distributed system contains various operation and monitoring systems 51 to 53 and distributed automation plant 54 to 57. The communication between the operation and monitoring systems 51 to 53 and automation plant 54 to 57 occurs via an Internet and/or Intranet 50. The various items of automation plant 54 to 57 can be arranged distributed at any physical distance from each other Access to the components 70 to 78 of the automation plant 54 to 57 is undertaken via Web services 60 to 68. The operation and monitoring systems 51, 52 and 53 are embodied in the exemplary embodiment as part of a maintenance system or as a mobile Personal Digital Assistant (PDA) of a service technician. Communication over the Internet and/or Intranet to 50 is undertaken not only between the operation and monitoring systems 51 to 53 and the automation plant 54 to 57 but also between the individual automation plant 54 to 57 or between the components 70 to 78 of the automation systems.

In a further exemplary embodiment a query service is provided which dynamically administers services, especially Web services, and can give information about currently available services or Web services and those that are running at present. To do this a local standardized service for managing and requesting the services is provided on the device (Personal Computer, Web server, automation device . . . ) for administering and querying the services offered on the device. An administrative service is used for administering the services provided by the device. The Query service is to be viewed as similar to the query interface from the COM world. Just as it is possible to establish via the method query interface which interfaces a COM object has, with the aid of the query service function a query can be made as to the services which the device provides. This permits clients in particular to react dynamically to existing functionality or to provide only the functionality to the device/server which can be actually used and is allowed to be used.

The possible usage scenarios of the invention are described below, especially in automation technology. The information function of a device can be used for diagnostic purposes for example. In a plant all existing devices are addressed via the query service and asked about the services or Web services which they offer. This function thus uses a generic diagnostic application to establish which devices provide a corresponding diagnostic function. The application automatically includes the devices found in the diagnosis of the system. Via the diagnostic function the application can read out the current version or diagnostic buffer and further process it.

In a further scenario a control is located in a manufacturing cell which controls the cell functionality. Maintenance work is to be carried out on the cell. To do this on safety grounds the cell must be "logically removed from the network", i.e. put into the maintenance state. This is done by temporarily stopping the services for accepting the manufacturing order data and additionally starting maintenance services. Now the manual maintenance work can be undertaken. Once the maintenance work is completed the corresponding services are started again and the cell signals that it is "ready for manufacturing orders".

In a further usage scenario a new device is to be put into operation. It is newly connected to an Intranet. Using the commissioning services provided by the device, the device is reconfigured and parameterized. Then these services are explicitly deactivated so that in productive mode no more changes can be made. Only the services for productive mode are available. If the transition into the commissioning phase is necessary again, this can be done through a special "Administration service". This is typically password-protected. The positive side-effect of this is that this "Administration service" can also be used to fulfill requests for the traceability of changes (e.g. from the American Food and Drug Administration).

If new software versions are to be copied into the automation device, this can be done through the dynamic loading of services. Through the Web service technology this update can be undertaken from a program or from a central point. To this end a program checks the current software status present in the system (e.g. by turning directly to the device or by searching a database of the system) and establishes which devices need an update/bugfix. An update is then copied into the device via the corresponding Web services of the device.

Finally in accordance with a further exemplary embodiment of the invention the situation is reached where run-time intensive services are only run outside busy times. In this case dynamic Web services only allow specific very time-intensive services which for example create more detailed logs of a manufacturing/production process and analyses of it, to only be activated outside busy times and not in normal operation.

For further explanation of the invention an overview of Web service technology is given below. This technology allows both direct communication between applications (so-called services) and also the building of applications from distributed components (again services), i.e. loosely-connected Web services can work together to fulfill a task. The Web service technology scales using standards such as XML and SOAP from local communication through to communication over the Intranet/Internet. It is the basis for distributed and integrated Internet applications, in this case using existing standards, (e.g. W3C, IET standards such as HTTP, XML, XML Schema, XML Data Types, etc.) or new standards defined together with W3C, IETF such as SOAP, WSDL, UDDI. Interfaces of Web services are described through meta information (methods, parameters (names and types)), usually in WSDL (Web Service Description Language). This complete interface description is sufficient for calling the Web services. It describes the end-point (port) under which the relevant Web service can be called and is especially useful for automatic communication with Web services. Web services give outstandingly simple access in which case the borders between local APIs and Web services ("Web-APIs") are blurred. The access is just as simple as for creating and using a local object. The Web service technology is thus the basis for loosely-coupled applications. It is characterized by message-based communications and scalability through absence of states. The loose coupling (e.g. with SOAP) in particular offers the advantages of good compatibility in relation to changes of the implementations for client and server and robust communication (port-based, message-based, asynchronous). In message-based systems a client packs messages into self-descriptive packets and sends them via the relevant communication connection. An agreement between transmitter and receiver only exists in relationship to the message format used on the line. The only assumption is that the receiver understands the message. No assumptions are made about what happens after the message is received or between transmitter and receiver. Normal Web services possess the following characteristics: They are accessible via a communication network such as the Internet/Intranet and possess an XML interface. Information about Web services is stored in a registry so that the Web services can be localized using his registry. They communicate with the aid of XML messages via web protocols and support loosely-coupled connections between systems.

In summary the invention thus relates to a data processing system 40 with improved provision of services 40, 41, 42 to provide functionalities. The data processing system 40 features at least one a first service 41 for activating at least one second service 42, with the services 40, 41, 42 being embodied as Web services. An advantageous embodiment of the invention allows the dynamization of static Web services through dynamizing services, which allows the Web services to be explicitly handled in a closed system. The system in this case is self-descriptive in relation to the services which it provides and their current status.

The invention claimed is:

1. A data processing system comprising services for providing functionalities, comprising:
   a processor;
   a dynamic Web service that provides an application programming interface that is available to an application executing on an external communication partner, and
   a first Web service executing on the processor and that is available to the external communication partner, the first Web service activating the dynamic Web service so that the dynamic Web service is executed on the processor thereby making the dynamic Web service available to the external communication partner.

2. The data processing system in accordance with claim 1, wherein the first Web service deactivates the dynamic Web service.

3. The data processing system in accordance with claim 1, wherein an activation or deactivation of the dynamic Web service depends on a current status of the data processing system.

4. The data processing system in accordance with claim 1, further providing status information of the dynamic Web service.

5. The data processing system in accordance with claim 4, wherein the status is dynamic.

6. The data processing system in accordance with claim 4, wherein the status includes at least one of the following:
   conditions necessary for the dynamic Web service to be activated,
   information about whether the dynamic Web service is loaded into the system temporarily or permanently,
   description of the application programming interface, and
   documentation for the application programming interface.

7. The data processing system in accordance with claim 4, wherein the status includes current availability of the application programming interface.

8. The data processing system in accordance with claim 1, wherein the data processing system is part of an automation system and that the services are provided for providing automation functionality.

9. An automation system, comprising
   a data processing system comprising:
     a processor,
     a first Web service executing on the processor, and
     a dynamic Web service providing a functionality via an application programming interface; and
   an external communication partner having access to the application programming interface,
   wherein the first Web service activates the dynamic Web service on the data processing system so that the dynamic Web service is executed on the processor thereby the dynamic Web service is available to the external communication partner.

10. The automation system in accordance with claim 9, wherein the dynamic Web service is activated in response to a run time of at least a portion of an application on the external communication partner.

11. The automation system in accordance with claim 9, wherein the dynamic Web service is activated in within a time-of-day range.

12. The automation system in accordance with claim 9, wherein in response to a new version of the dynamic Web service being available, the first Web service deactivates the dynamic Web service such that the Web service not executing on the processor and activates the new version of the dynamic Web service such that the new dynamic Web service is executed on the processor, thereby providing uninterrupted service of the dynamic Web service.

13. The automation system in accordance with claim 9, wherein the deactivated dynamic Web service and the new version of the dynamic Web service do not maintain state information.

14. The data processing system in accordance with claim 1, wherein the dynamic Web service is activated in response a run time of at least a portion of an application on the external communication partner.

15. The data processing system in accordance with claim 1, wherein the dynamic Web service is activated in within a time-of-day range.

16. The data processing system in accordance with claim 1, wherein a new version of the dynamic Web service is available, the first Web service deactivates the dynamic Web service and activates the new version of the dynamic Web service to provide and uninterrupted service of the dynamic Web service.

17. The data processing system in accordance with claim 16, wherein the deactivated dynamic Web service and the new version of the dynamic Web service do not maintain state information.

18. An automation system, comprising:
   a data processing system comprising:
      a processor,
      a interface executing on the processor, and
      a dynamic Web service providing a functionality via application programming interfaces; and
   an external communication partner having an application that calls the application programming interface,
   wherein the first interface activates the dynamic Web service on the data processing system so that the dynamic Web service is executed on the processor thereby the dynamic Web service is available to the external communication partner.

19. The automation system in accordance with claim 18, wherein the dynamic Web service is activated at a run time of an application on the external communication partner.

20. The data processing system in accordance with claim 19, wherein the status includes current availability of the application programming interface.

* * * * *